(12) United States Patent
Jaluthariya et al.

(10) Patent No.: US 11,171,531 B2
(45) Date of Patent: Nov. 9, 2021

(54) END WINDING ARRANGEMENT FOR AN ELECTRO-MECHANICAL DEVICE

(71) Applicants: Mukesh Kumar Jaluthariya, Jaipur (IN); Sonam Tewari, Kanpur (IN); Narendra Singh, Jaipur (IN); Neelima Tailor, Beawar (IN)

(72) Inventors: Mukesh Kumar Jaluthariya, Jaipur (IN); Sonam Tewari, Kanpur (IN); Narendra Singh, Jaipur (IN); Neelima Tailor, Beawar (IN)

(73) Assignee: Siemens Energy Global GmbH & Co. KG, Munich (DE)

( * ) Notice: Subject to any disclaimer, the term of this patent is extended or adjusted under 35 U.S.C. 154(b) by 209 days.

(21) Appl. No.: 16/452,672

(22) Filed: Jun. 26, 2019

(65) Prior Publication Data

US 2020/0006996 A1    Jan. 2, 2020

(30) Foreign Application Priority Data

Jun. 27, 2018 (EP) .................................... 18180187

(51) Int. Cl.
*H02K 3/28* (2006.01)
*H02K 3/50* (2006.01)

(52) U.S. Cl.
CPC .................................. *H02K 3/505* (2013.01)

(58) Field of Classification Search
CPC ............ H02K 3/12; H02K 3/28; H02K 3/505
See application file for complete search history.

(56) References Cited

U.S. PATENT DOCUMENTS

| | | | | |
|---|---|---|---|---|
| 5,789,840 | A * | 8/1998 | Gould | H02K 3/12 310/179 |
| 7,312,551 | B2 * | 12/2007 | Klamt | H02K 3/12 310/179 |
| 8,497,617 | B2 * | 7/2013 | Dang | H02K 3/12 310/201 |
| 2013/0307359 | A1 | 11/2013 | Vitello et al. | |

FOREIGN PATENT DOCUMENTS

WO    WO2006063186 A1    6/2006

OTHER PUBLICATIONS

European Search Report for European Patent Application No. 18180187.9-1201 dated Dec. 13, 2018.
European Office Action for European Application No. 18 180 187.9-1201 dated Nov. 24, 2020.
European Office Action for European Application No. 18180187.9-1201 dated Jul. 15, 2021.

* cited by examiner

*Primary Examiner* — Dang D Le
(74) *Attorney, Agent, or Firm* — Lempia Summerfield Katz LLC

(57) ABSTRACT

An end winding arrangement of a stator of an electro-mechanical device is provided. The end winding arrangement includes at least two stator bars, wherein each stator bar has a linear member and a cell bend member. Each of the at least two stator bars is configured to have a unitary involute member extending from each cell bend member such that the involute member is configured as a single involute section without a lead bend section for reducing vibrations in the electro-mechanical device.

11 Claims, 9 Drawing Sheets

(STATE OF ART)

(STATE OF ART)

END WINDING ARRANGEMENT FOR AN ELECTRO-MECHANICAL DEVICE

The present patent document claims the benefit of European Patent Application No. EP 18180187.9, filed Jun. 27, 2018, which is also hereby incorporated by reference.

TECHNICAL FIELD

The present disclosure relates to an end winding arrangement of a stator of an electro-mechanical device, having at least two stator bars, each stator bar including a linear member, an involute member, and a cell bend member.

BACKGROUND

Certain electro-mechanical devices are known to a person skilled in the art. Such a commonly known electro-mechanical device is, for example, an electric generator.

An electric generator may include a stator and a rotor disposed within the stator. FIG. 1 illustrates an end winding arrangement 101, in accordance to the state of the art, of a stator of an electric generator. The end winding arrangement 101 has a plurality of stator bars 201 interconnected by conductors 106. Each of the stator bars 201 accommodates therewithin a conductor 106. Each stator bar 201 has a linear member 103, an involute member 104, and a cell bend member 105. FIG. 2 illustrates a stator bar 102, in accordance to the state of the art, of the end winding arrangement 101 illustrated in FIG. 1. The linear member 103 and the involute member 104 are attached via the cell bend member 105. The involute member 104 has an involute section 104A extending from the cell bend member 105, and a lead bend section 104B extending from the involute section 104A. The conductor 106 extends out of the lead bend section 104B. The lead bend section 104B is disposed angularly with respect to the involute section 104A to provide ease of connection of the conductors 106 accommodated therewithin. The end winding arrangements 101, in electric generators, may be required for coil connections via these conductors 106. A large amount of material such as copper is spent for construction of these end winding arrangements 101. Moreover, length of the involute members 104 of the stator bars 102, make the stator and in turn the generator longer and bulkier in size thereby, introducing vibration issues during operation of the electric generator which leads to dusting, strand breakage, etc. Furthermore, higher rewound time is required as a large quantity of auxiliary connection elements such as diamond spacers and end blocks are required for longer involute members 104. Furthermore, longer length of the involute members 104 poses design challenges in terms of not meeting electrical strikes with stator frame and creates many design complexities and manufacturing complexities due to bending of the stator bars 201. Additionally, longer length of the involute members 104 requires complex arrangement for mechanical support of the stator thereby increasing costs associated therewith.

SUMMARY AND DESCRIPTION

The scope of the present disclosure is defined solely by the appended claims and is not affected to any degree by the statements within this summary. The present embodiments may obviate one or more of the drawbacks or limitations in the related art.

Therefore, it is an object of the present disclosure to provide an end winding arrangement of a stator of an electro-mechanical device of the aforementioned kind, having at least two stator bars each including at least a linear member, a cell bend member, and an involute member, that reduces size of the electro-mechanical device and costs associated therewith, without compromising operational efficiency of the electro-mechanical device.

The end winding arrangement achieves the aforementioned object, in that each of the at least two stator bars is configured to have a unitary involute member, that is a single involute member without any lead bends, extending from the cell bend member such that an overall length of the stator bar is reduced.

In accordance with the present disclosure, an end winding arrangement of a stator of an electro-mechanical device, having at least two stator bars each including at least a linear member, an involute member, and a cell bend member is provided. While the disclosure has been described with reference to various parts of the stator bar addressed using words such as a linear member, an involute member, and a cell bend member, it is understood that a stator bar is configured as a single piece of material and that these words, which have been used herein and after, are merely words of description to identify and illustrate various parts of the stator bar, rather than words of limitation and are in no way to be construed as limiting of the present disclosure herein.

In accordance with the present disclosure, each stator bar of the at least two stator bars is configured to have a unitary involute member extending from the cell bend member. The unitary involute member refers to a single involute section extending from the cell bend member, for example, a member having a gradual change in its slope along its length, without a drastic change of slope such as a near orthogonal bend. Advantageously, the involute member is configured without a lead bend section as disclosed in FIG. 2. The involute member is configured of a developed length of about 15% to about 60% of a developed length of the stator bar. Elimination of the lead bend section results in a reduction in an overall developed length of the stator bar of about 3% to about 6%. The involute member is disposed angularly with respect to a linear member of the stator bar and is attached to the linear member via the cell bend member. The involute member is cantilevered at the cell bend member such that a free end of the involute member provides an opening for conductors to extend through, for connection with conductors accommodated inside other involute members of other stator bars.

The end winding arrangement disclosed herein includes a connector member configured to interconnect the conductor accommodated inside each of the two stator bars. Due to elimination of the lead bend section, the conductors extending out of the involute member are disposed angularly with respect to the linear member. In an embodiment, the conductors extending out of the involute member are aligned with respect to the geospatial positioning, for example, an inclination, of the involute member. In another embodiment, the conductors extending out of the involute member are configured according to connection requirements, for example, the conductors of the at least two stator bars are bent towards each other in order to be fastened by a fastener.

In order to interconnect each of the conductors, the connector member is configured to have a twisted and/or a non-twisted configuration. The twisted configuration includes, for example, a configuration wherein two or more parts of the connector member have their planes angularly disposed with respect to one another. Connector members with twisted configurations include, for example, a bent clip connector member, a curved clamp connector member, etc.

Advantageously, the twisted-configuration connector members avoid requirement to bend the conductors thereby, reducing complexities involved in the assembly of the end winding arrangement. The non-twisted configuration includes, for example, a configuration wherein the parts of the connector member majorly lie in a single plane. Connector members with non-twisted configurations include, for example, a nut-bolt connector member, a pin connector member, a linear clamp connector member, etc. The connector member configuration is selected based on the conductor being connected, (e.g., a shape, a configuration, etc., of the conductor being connected). In an embodiment, when the conductor extending through the involute member is having a rectangular shaped flat end extending at an axial inclination nearly same as an axial inclination of the involute member, a twisted configuration of the connector member is selected for interconnection of the conductors. In another embodiment, when the conductor extending through the involute member is of a configuration including, for example, a conductor with a bent end, a conductor with a curved end, a conductor with a protruding end, etc., a non-twisted configuration of the connector member is selected.

Also disclosed herein is a stator for an electro-mechanical device having a frame, a stator core attached to the frame, and the aforementioned end winding arrangement having at least two stator bars each having at least a linear member and a cell bend member, wherein each of the stator bars is configured to have a unitary involute member extending from the cell bend member.

Also disclosed herein is an electro-mechanical device having a rotor and a stator including the aforementioned end winding arrangement having at least two stator bars each having at least a linear member and a cell bend member, wherein each of the stator bars is configured to have a unitary involute member extending from the cell bend member. The electromechanical device is an electric generator or an electric motor.

BRIEF DESCRIPTION OF THE DRAWINGS

The above-mentioned and other features of the disclosure will now be addressed with reference to the accompanying drawings. The illustrated embodiments are intended to illustrate, but not limit the disclosure.

The present disclosure is further described hereinafter with reference to illustrated embodiments shown in the accompanying drawings, in which.

DETAILED DESCRIPTION

Figure 1:
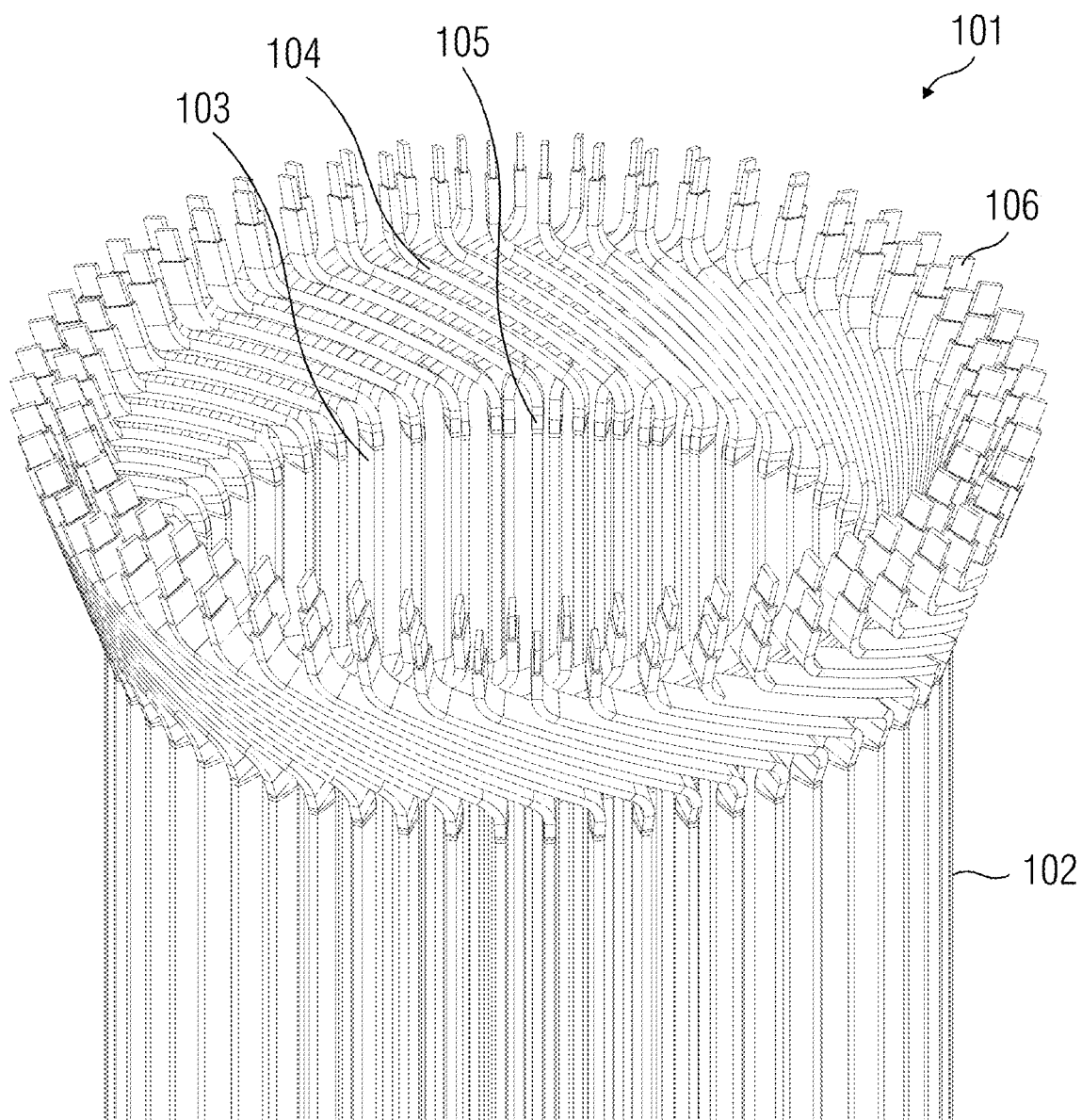
FIG. 1 illustrates an end winding arrangement, in accordance to the state of the art, of a stator of an electric generator.
Figure 2:
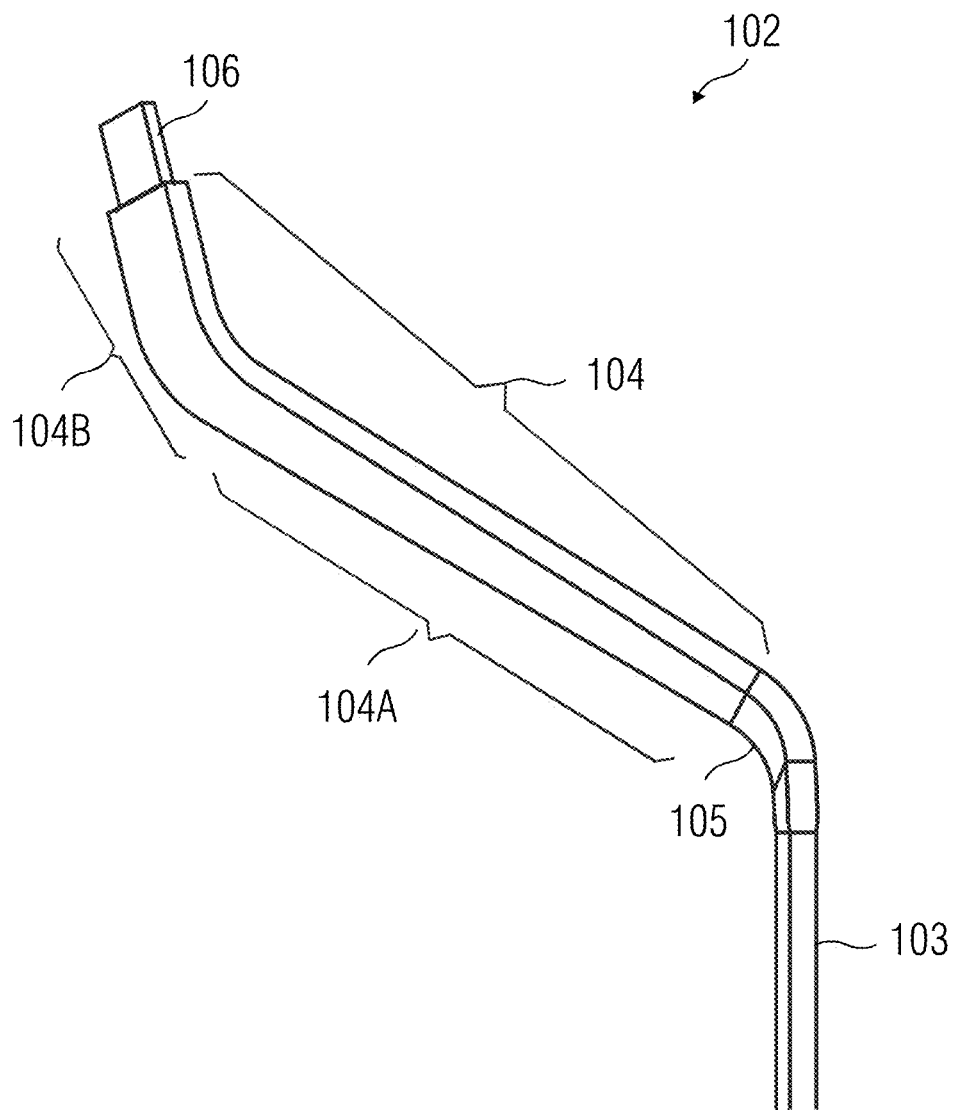
FIG. 2 illustrates a stator bar, in accordance to the state of the art, of the end winding arrangement illustrated in FIG. 1.

Various embodiments are described with reference to the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Figure 3:
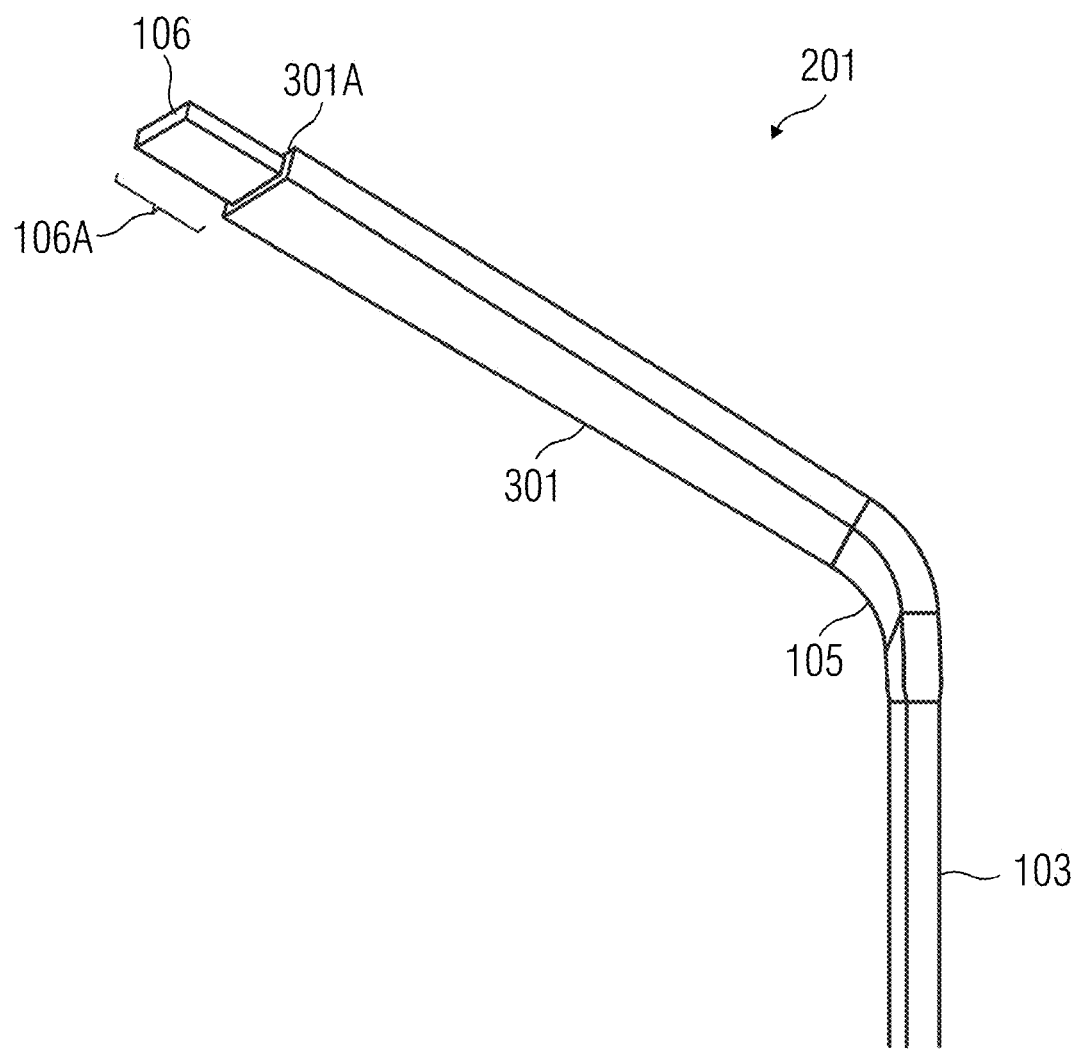
FIG. 3 illustrates an example of a stator bar of an end winding arrangement of a stator of an electric generator.

FIG. 3 illustrates a stator bar 201 of an end winding arrangement of a stator of an electric generator. The stator bar 201 includes a linear member 103, a cell bend member 105, and an involute member 301. A conductor 106 is accommodated within the stator bar 201 and extends from within the linear member 103 and out of a free end 301A of the involute member 301. The involute member 301A and a top part 106A of the conductor 106 extending through the involute member 301, are aligned with respect to each other as shown in the FIG. 3.

Figure 4A:
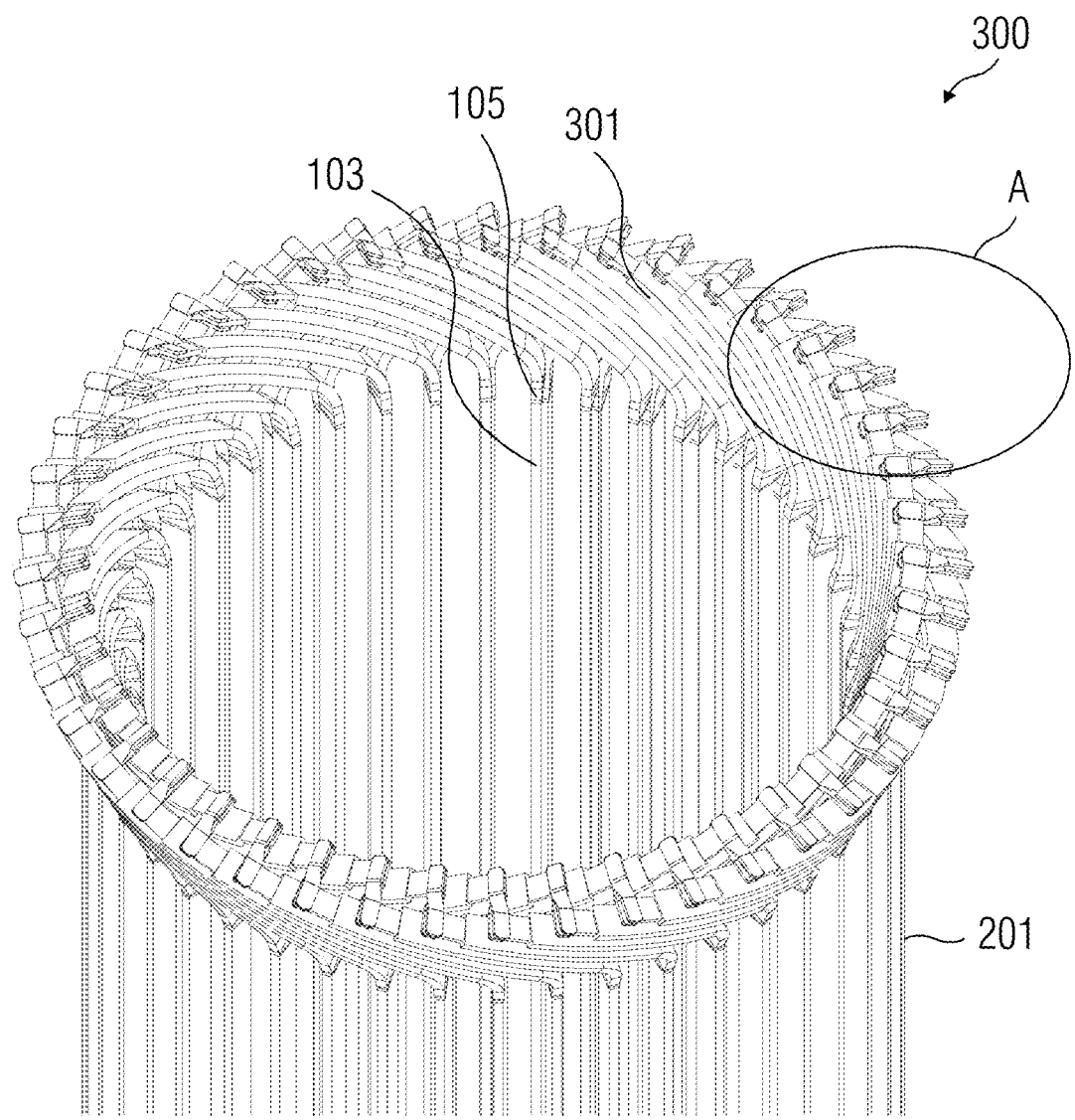
FIG. 4A illustrates an example of an end winding arrangement having stator bars illustrated in FIG. 3.
Figure 4B:
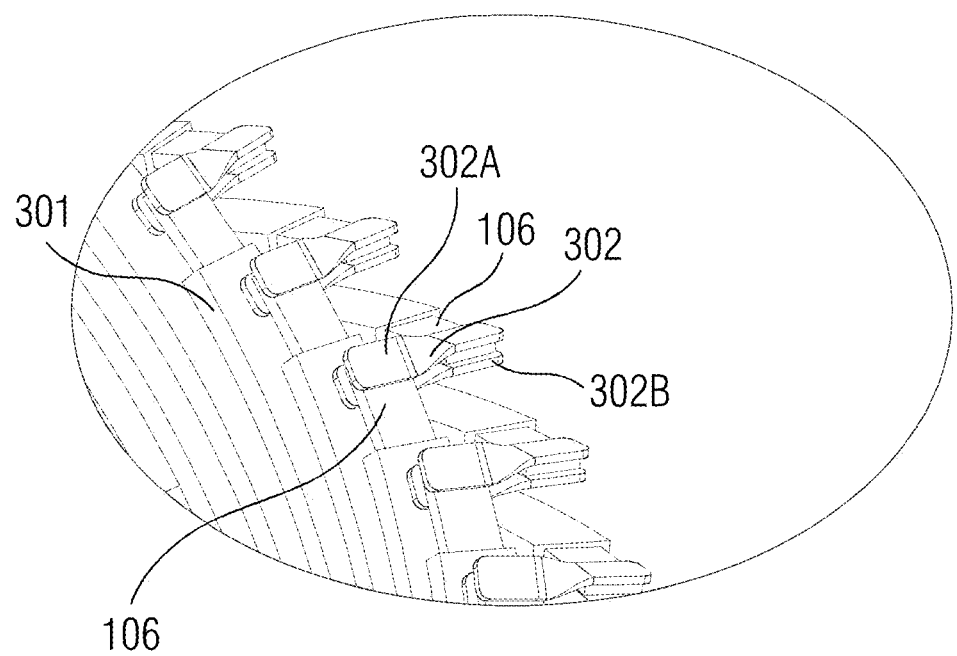
FIG. 4B illustrates an enlarged view of a portion of the end winding arrangement marked "A" in FIG. 4A showing connector members.

FIG. 4A illustrates an end winding arrangement 300 having stator bars 201 illustrated in FIG. 3. The end winding arrangement 300 includes multiple stator bars 201 each having a linear member 103, an involute member 301, and a cell bend member 105. FIG. 4B illustrates an enlarged view of a portion of the end winding arrangement 300 marked "A" in FIG. 4A showing connector members 302. Each of the connector members 302 connects the conductors 106 accommodated inside the stator bars 201 and extending out of the involute members 301. As shown in FIG. 4B, the connector members 302 are of a twisted configuration in form of a twisted clip structure for connecting conductors 106. Parts 302A and 302B of the twisted clip structures each accommodate conductors 106 there within for forming a connection there between.

Figure 5A:
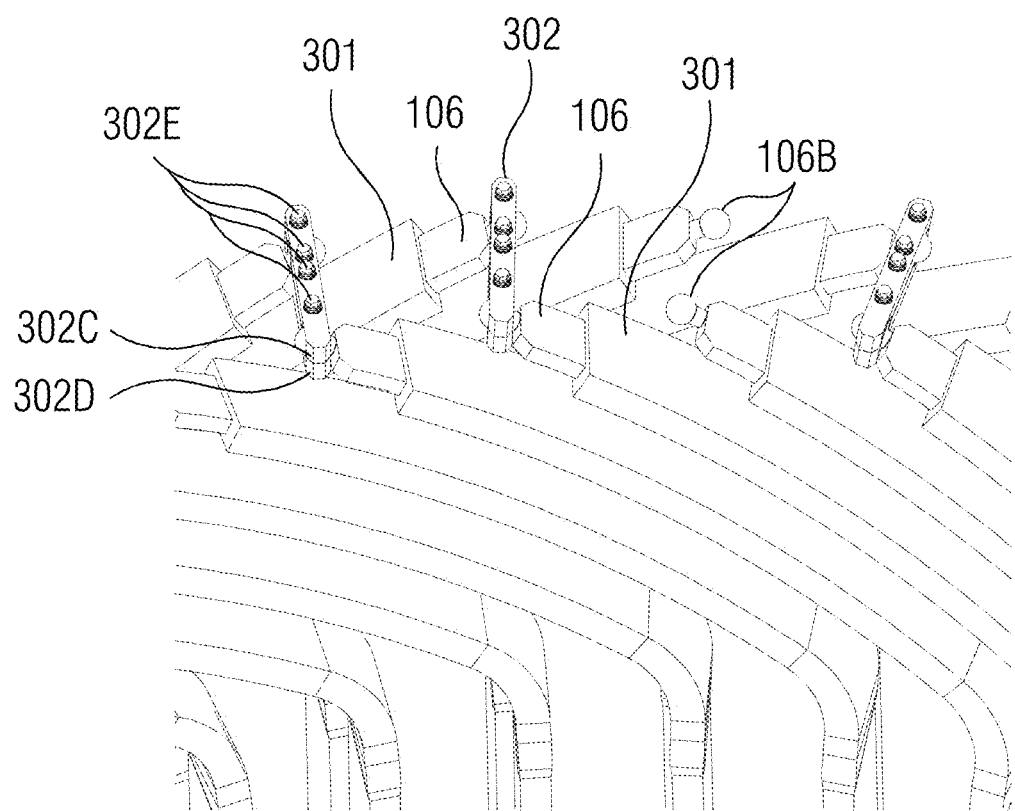
FIGS. 5A-5C illustrate various embodiments of a connector member used for interconnecting conductors accommodated within the involute members of the end winding arrangement illustrated in FIG. 4A.
Figure 5B:
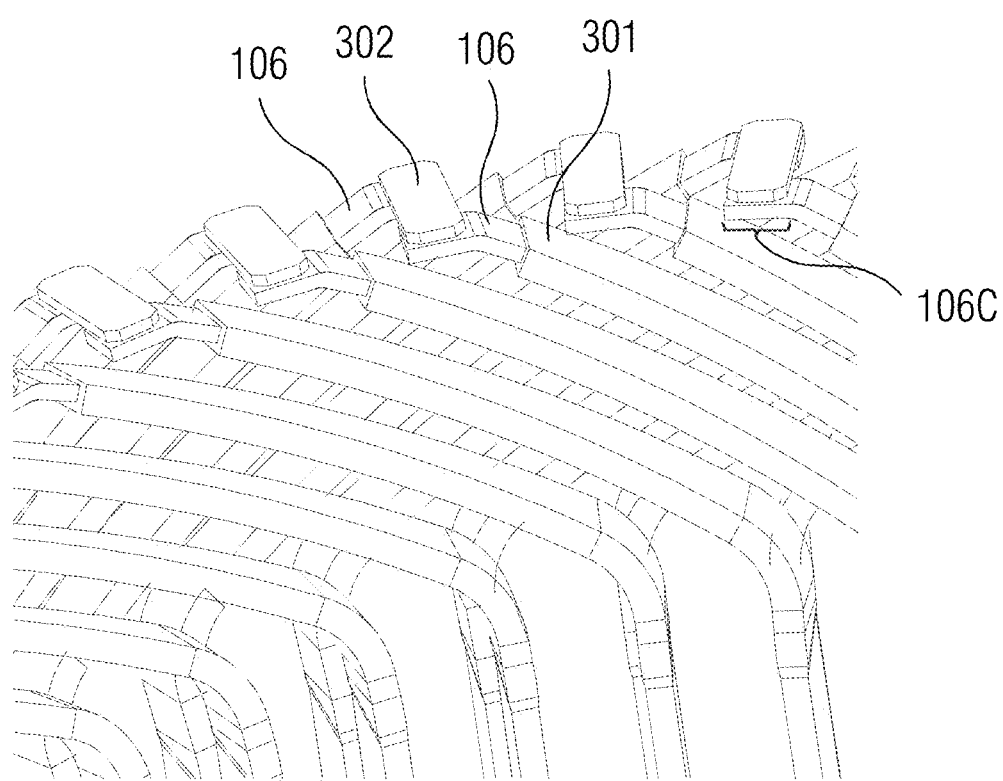
Figure 5C:
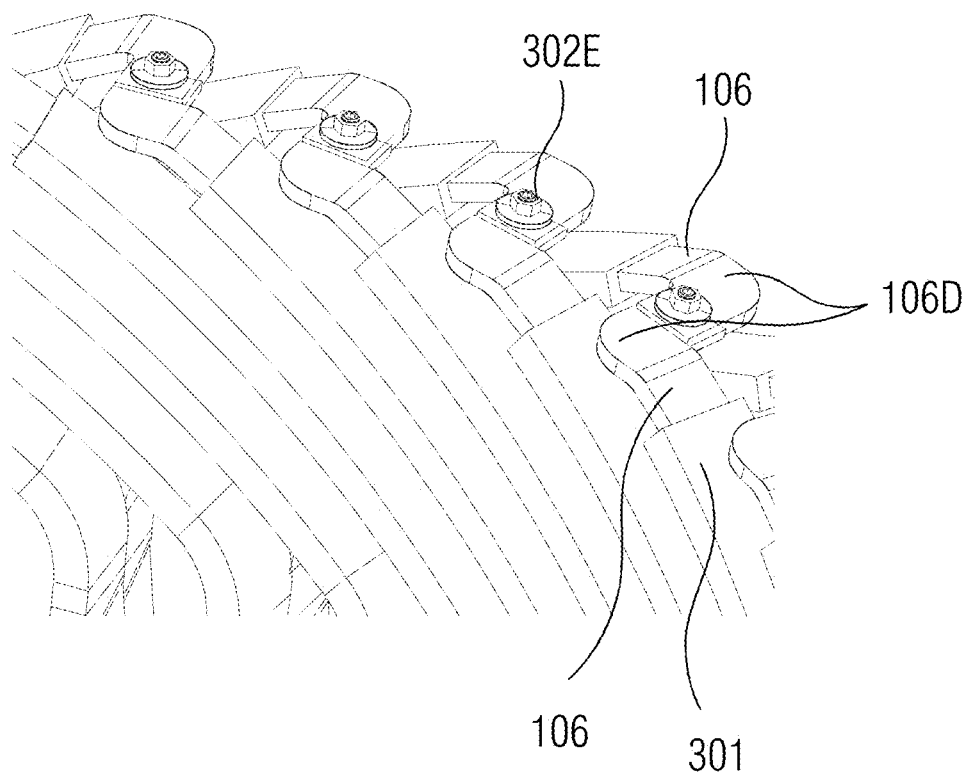

FIGS. 5A-5C illustrate various embodiments of a connector member 302 used for interconnecting conductors 106 accommodated within the involute members 301 of the end winding arrangement 300 illustrated in FIG. 4A. FIG. 5A illustrates a connector member 302 of a non-twisted configuration in form of a pair of linear plates 302C and 302D clamped together via one or more fasteners 302E to form a connection between the conductors 106. The conductors 106 are configured to have protrusions 106B in form of spherical connections, that are fastened between the linear plates 302C and 302D with help of fasteners 302E. FIG. 5B illustrates a connector member 302 of yet another non-twisted configuration in form of a flat bar, for interconnection the conductors 106. The conductors 106 are configured with bent ends 106C that are connected via the connector members 302. FIG. 5C illustrates a connector member 302 of yet another non-twisted configuration in form of a fastener 302E such as a nut-bolt arrangement for fastening the conductors 106. The conductors 106 are configured to form joints there between, for example, with curved ends 106D to form a lap joint or a bolted joint by having mutually cavities overlapping for accommodating the fastener 302E.

Figure 6:
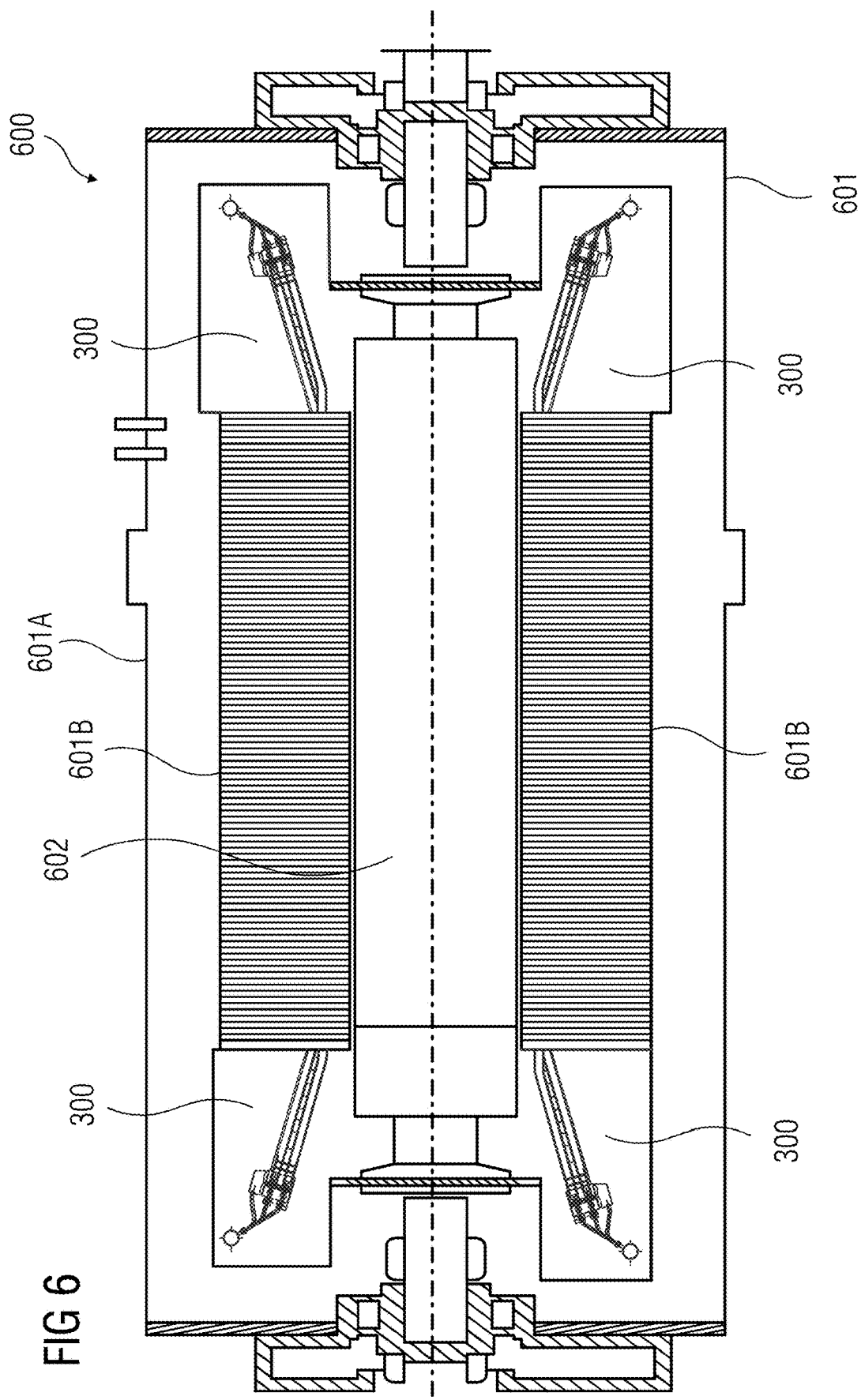
FIG. 6 illustrates an example of a sectional view of an active part of an electric generator having a rotor and a stator with the end winding arrangement.

FIG. 6 illustrates a sectional view of an active part of an electric generator 600 having a rotor 602 and a stator 601 with the end winding arrangement 300. As illustrated in FIG. 6, the stator 601 includes a frame 601A, a stator core 601B partially surrounding the rotor 602, and stator bars 201. The stator bars 201 are rigidly attached to the stator core 601B.

The end winding arrangement 300 shown in FIG. 6 is as disclosed in the detailed description of FIGS. 3-5C.

The foregoing examples have been provided merely for the purpose of explanation and are in no way to be construed as limiting of the present disclosure. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may affect numerous modifications thereto and changes may be made without departing from the scope and spirit of the disclosure in its aspects.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. An end winding arrangement of a stator of an electro-mechanical device, the end winding arrangement comprising:
   at least two stator bars, wherein each stator bar of the at least two stator bars comprises at least a linear member and a cell bend member, and wherein each stator bar of the at least two stator bars has a unitary involute member extending from the cell bend member; and
   a connector member interconnecting a conductor accommodated inside each stator bar of the at least two stator bars,
   wherein the conductor of each stator bar of the at least two stator bars has a linear part extending out of a free end of the respective unitary involute member, and
   wherein the conductor of each stator bar of the at least two stator bars has a curved end with a cavity configured to form a lap joint with the respective other conductor.

2. The end winding arrangement of claim 1, wherein each unitary involute member is configured without a lead bend section.

3. The end winding arrangement of claim 2, wherein each unitary involute member is cantilevered at the cell bend member.

4. The end winding arrangement of claim 3, wherein each unitary involute member has a developed length in a range of 15% to 60% of a developed length of the respective stator bar.

5. The end winding arrangement of claim 1, wherein each unitary involute member is cantilevered at the cell bend member.

6. The end winding arrangement of claim 1, wherein each unitary involute member has a developed length in a range of 15% to 60% of a developed length of the respective stator bar.

7. The end winding arrangement of claim 1, wherein the connector member is has a non-twisted configuration.

8. The end winding arrangement of claim 1, wherein a configuration of the connector member is selected based on the conductors being connected.

9. A stator for an electro-mechanical device, the stator comprising:
   a frame;
   a stator core attached to the frame; and
   an end winding arrangement extending from the stator core, the end winding arrangement comprising:
      at least two stator bars, wherein each stator bar of the at least two stator bars comprises at least a linear member and a cell bend member; and wherein each stator bar of the at least two stator bars has a unitary involute member extending from the cell bend member; and
      a connector member interconnecting a conductor accommodated inside each stator bar of the at least two stator bars,
      wherein the conductor of each stator bar of the at least two stator bars has a linear part extending out of a free end of the respective unitary involute member, and
      wherein the conductor of each stator bar of the at least two stator bars has a curved end with a cavity configured to form a lap joint with the respective other conductor.

10. An electro-mechanical device comprising:
    a rotor; and
    a stator comprising:
       a frame;
       a stator core attached to the frame; and
       an end winding arrangement extending from the stator core, the end winding arrangement comprising:
          at least two stator bars, wherein each stator bar of the at least two stator bars comprises at least a linear member and a cell bend member, and wherein each stator bar of the at least two stator bars has a unitary involute member extending from the cell bend member; and
          a connector member interconnecting a conductor accommodated inside each stator bar of the at least two stator bars,
          wherein the conductor of each stator bar of the at least two stator bars has a linear part extending out of a free end of the respective unitary involute member, and
          wherein the conductor of each stator bar of the at least two stator bars has a curved end with a cavity configured to form a lap joint with the respective other conductor.

11. The electro-mechanical device of claim 10, wherein the electro-mechanical device is electric generator and an electric motor.

* * * * *